J. C. GRAHAM.
WEIGHING MACHINE.
APPLICATION FILED MAR. 30, 1908.
918,442.
Patented Apr. 13, 1909.
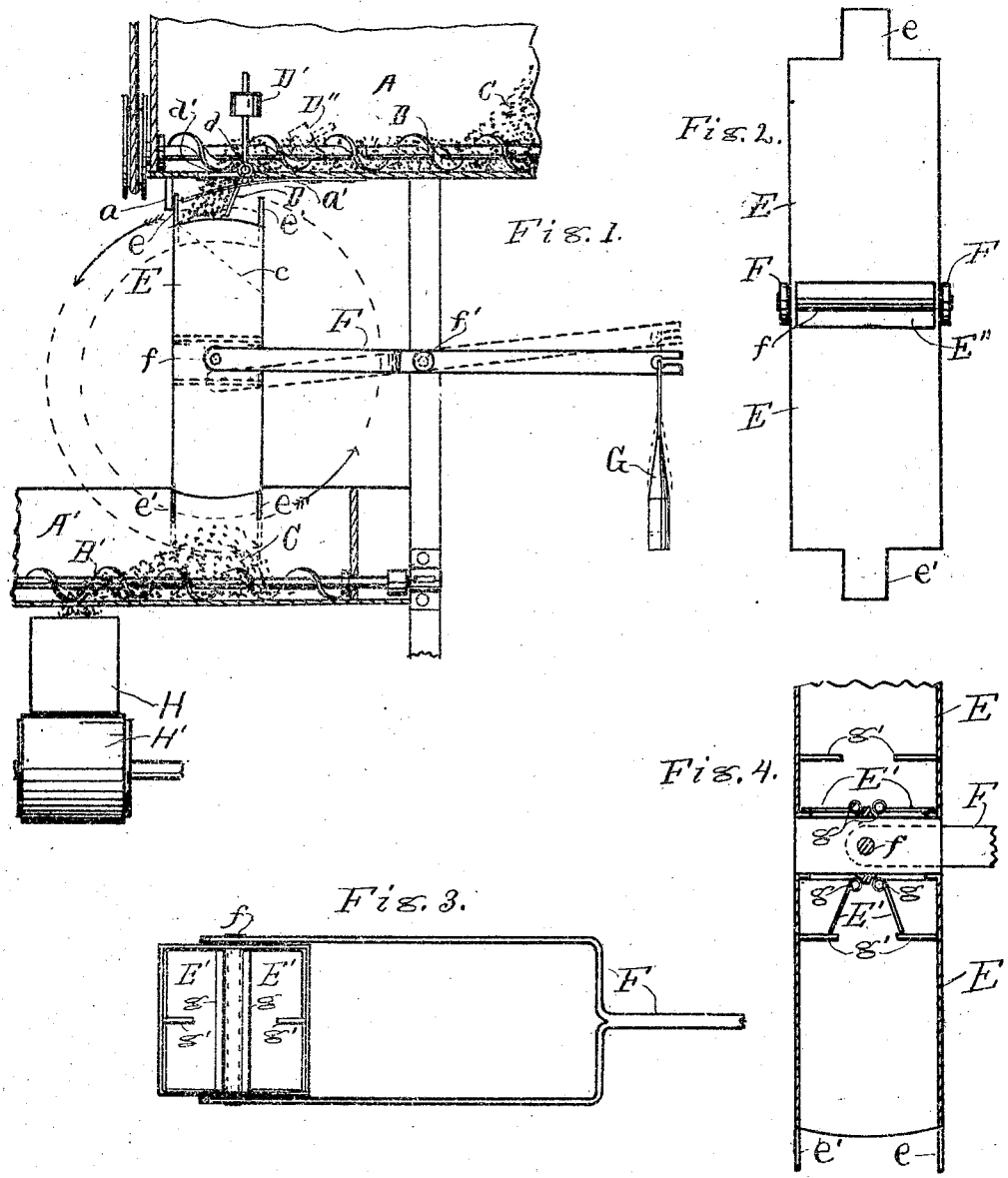
Witnesses
A. Allgier
E. J. Noble
Inventor
John C. Graham
Detrich J. Cilley
Attorney

UNITED STATES PATENT OFFICE.

JOHN CALVIN GRAHAM, OF GRANDVILLE, MICHIGAN.

WEIGHING-MACHINE.

No. 918,442.　　　　Specification of Letters Patent.　　　Patented April 13, 1909.

Application filed March 30, 1908. Serial No. 424,279.

*To all whom it may concern:*

Be it known that I, JOHN C. GRAHAM, a citizen of the United States, residing at Grandville, in the county of Kent and State of Michigan, have invented certain new and useful Improvements in Weighing-Machines, of which the following is a specification.

My invention relates to improvements in rotary weighing machines for use in weighing pulverized plaster, and its several products, Portland cement, wheat or buckwheat flour and other finely pulverized substances that are of such a nature that the minute particles lie together or attract each other closely enough to become embedded in the bottoms of the weighing trays and retain a portion of the material in the bottoms of the trays when they are reversed, and its objects are: first, to provide a rotary weighing machine with which the last particle of the material being weighed will be discharged from the trays as soon as they are reversed for emptying. Second, to provide a means for holding the pulverized material in the hopper while the trays are being reversed, thus averting the danger of scattering the finely pulverized material into the receiving conveyer or about the apartment in which the material is being handled, and, third, to provide a means of conveying the weighed material from the receiving conveyer to the cartons in which it is to be packed and shipped, and to convey said cartons from under said receiving conveyer. I accomplish these objects by the mechanism illustrated in the accompanying drawings in which—

Figure 1 is an elevation of the weighing device with the hopper and the receiving conveyer shown in section to illustrate the manner of conveying the pulverized material to and from the weighing trays. Fig. 2 is an elevation of the weighing trays detached, showing an air space between their adjacent ends. Fig. 3 is a top plan of the tray and balancing arm that supports it, and Fig. 4 is an elevation of the trays shown in section on line *x x* of Fig. 3, showing the location and movement of the valves in the ends of the trays for the entrance of air so that the material will all fall out of the trays as soon as they have been reversed after having been filled with plaster, cement, flour or any other finely pulverized material.

Similar letters refer to similar parts throughout the several views.

I am aware that rotary weighing machines are common for weighing grains &c., but for this purpose, the grain being smooth in kernels of sufficient size so that air spaces exist between the kernels and all will roll or slide out of the trays without difficulty, but any material that is so finely pulverized as to pack together so closely as to practically preclude the possibility of any air intermingling with the particles to hold them apart or to allow of their ready separation, will adhere in a, practically, concrete mass in the corners and bottom of the trays unless some means is provided for admitting air below or back of it, which has not been provided for in any of the trays so far provided for this class of machines and as this machine is designed expressly for use in weighing finely pulverized land plaster or plaster-paris, and Portland cement I find it essentially necessary to provide against the adhesive nature of the particles, and have constructed my machine as follows:

The plaster C is passed from the grinding or mixing machinery into the conveyer or hopper A where it is conveyed to an opening, *d'*, on the bottom of the conveyer, by means of any suitable form of conveying device, preferably a shaft, as B, having a screw flange thereon. The trays E E are made in pairs standing end to end, as shown, and have a space, as E'', between them for the free passage of air, and in the bottom of each tray I place air valves, as E', pivoted, as at *g g* so that the opposite edges may swing freely up and down, as indicated in Fig. 4, but the opposite ends of the trays are left open so that when the tray is right end up to receive material from the conveyer shaft B' the valves will close down and form a dust tight bottom to support the tray full of the material, but when the tray is reversed for emptying the material out of it the valves will open sufficiently to allow air to enter the tray back of or above the material so that there will be no possibility of the material adhering to the sides or bottom of the trays and failing to empty the trays completely, the air for operating said valves being admitted through the space E'' between the adjacent ends of the trays. These trays are pivotally supported by the lever or scale beam F, as at *f*, so that they may be made to revolve easily thereon, and the scale arm is pivotally supported, as at *f'*, and provided with a weight G at the back end so that the empty trays will be held up to the position indicated by the solid lines in Fig. 1 until the proper amount of material passes into one, when its weight will cause it to drop down until the projection e on the tray falls below the projection a on the conveyer A when the tray will, by reason of the greater weight of material on one side of the tray than on the other side, indicated by the dotted line c in Fig. 1, drop over to the left, as indicated by the dotted lines and arrow to the left of Fig. 1, and will empty the material into the conveyer bin A', as indicated at C, whence it is conveyed, by the screw B', to position to fall into the shipping carton H, which is supposed to be supported upon a conveyer belt H' to be conveyed to any desired place for packing &c. After the tray has been emptied the weight G carries them back to the position indicated by the solid lines so that the opposite tray will be caught and held by the projection a. The spring a' is placed upon the bottom of the conveyer in position to drop behind the projection e and avert the danger of the hopper swinging backward when it is stopped by the projection a.

To avert the danger of the finely pulverized material passing out of the conveyer A when the trays are passing around to empty their contents, I place a gate D, pivoted to the bottom of the conveyer, as at d, in position so that as the tray starts to pass from under the conveyer the projection e' on the tray will engage the gate and force it to position to close the opening d', and the weight D' will be carried to the position indicated by the dotted lines D'' and hold the gate closed until a sufficient amount of material has been conveyed to the gate to overcome the weight of the weight D', by which time the returning tray will have assumed position to receive the material as the gate opens.

The weight G is made with the top terminating in a point to avert the danger of fine particles of plaster or other dust collecting upon it and interfering with the accuracy of weight desired.

To avert the danger of the gates E' opening too wide or remaining open after the tray has assumed position for receiving material from the conveyer I find it well to place stops, as g', in position to catch and support them while the material is passing out of the tray, and prefer the use of small wires placed as indicated, though I do not desire to restrict myself from using any form, either of stop or valve that may be made available for the purposes hereinbefore stated.

Having thus described my invention, what I claim as new, and desire to secure by Letters Patent of the United States, is:

1. The combination in a rotary weighing machine, of trays open at one end and constructed to stand with the open end upward to receive material and to be turned with the open end downward to discharge material, a lever and weight to balance and weigh the trays and material, a conveyer, a gate pivoted in the conveyer in position to be actuated by the trays to prevent the flow of material from the conveyer when the trays are not in position to receive it, and valves in the adjacent ends of the trays arranged to open and admit air above the material to facilitate the flow of the material from the tray when it is turned with the open end downward.

2. In a rotary weighing machine, trays located end to end with an air space between the adjacent ends and the opposite ends open, said trays constructed to be placed with the open ends upward to receive material and to be turned with the open ends downward to discharge material, valves located in the adjacent ends of the trays and arranged to open and admit air into the upper ends of the trays above the material when the trays are turned with the open end downward and facilitate the flow of material from the trays.

3. In a rotary weighing machine, a lever centrally pivoted, a weight supported on one end of said lever and trays pivotally supported on the other end of said lever, said trays located end to end with the opposite ends open and the adjacent ends having valves therein and an air space between them, said valves arranged to open and admit air above the material when the trays are turned with the open ends downwards, to facilitate the discharge of material from the trays.

4. In a rotary weighing machine, a conveyer having an opening for the discharge of material, a gate pivotally secured in position to close said opening, a weight secured to said gate to hold it in position, trays supported end to end, centrally pivoted, having an air space between the adjacent ends, and open at the opposite ends and arranged to stand with the open ends upward to receive material from the conveyer and to turn with the open ends downward to discharge material from the trays, valves in the adjacent ends of the trays so arranged that they will open and admit air above the material when the trays are turned with the open ends downward and facilitate the discharge of material from the trays, a lever and weight for supporting the trays and actuating them vertically and projections on the trays in position to actuate the gate on the conveyer.

Signed at Grandville Michigan March 17th 1908.

JOHN CALVIN GRAHAM.

In presence of—
MILTON VELZY,
ALBERT M. BEUKEMA.